(12) United States Patent
Szeto et al.

(10) Patent No.: US 9,935,440 B1
(45) Date of Patent: Apr. 3, 2018

(54) POWERED WALL MOUNT FOR A PORTABLE ELECTRONIC DEVICE

(71) Applicant: Nanoport Technology Inc., Markham (CA)

(72) Inventors: Timothy Jing Yin Szeto, Mississauga (CA); David Michael Lopez Reyes, Toronto (CA)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

(21) Appl. No.: 15/729,932

(22) Filed: Oct. 11, 2017

Related U.S. Application Data

(60) Provisional application No. 62/464,959, filed on Feb. 28, 2017, provisional application No. 62/555,614, filed on Sep. 7, 2017.

(51) Int. Cl.
*H02G 3/14* (2006.01)
*H01R 13/62* (2006.01)
*H02G 3/30* (2006.01)

(52) U.S. Cl.
CPC .......... *H02G 3/14* (2013.01); *H01R 13/6205* (2013.01); *H02G 3/305* (2013.01)

(58) Field of Classification Search
CPC ....... H02G 3/14; H02G 3/305; H01R 13/6205
USPC .......................................................... 174/66
See application file for complete search history.

(56) References Cited

U.S. PATENT DOCUMENTS

| | | | |
|---|---|---|---|
| 4,617,613 A | 10/1986 | Rice | |
| 6,423,900 B1 | 7/2002 | Soules | |
| 7,511,219 B2 * | 3/2009 | Dinh | H02G 3/088 174/53 |
| 8,668,347 B2 | 3/2014 | Ebeling | |
| 8,912,442 B2 | 12/2014 | Smith | |
| 9,035,180 B2 | 5/2015 | Smith | |
| 9,035,181 B2 | 5/2015 | Smith | |
| 9,312,633 B1 | 4/2016 | Szeto | |
| 9,362,728 B2 | 6/2016 | Smith | |
| 2017/0257146 A1 | 9/2017 | Szeto | |

FOREIGN PATENT DOCUMENTS

WO 2015070321 5/2015
WO 2017083986 5/2017

* cited by examiner

*Primary Examiner* — Dhirubhai R Patel

(57) ABSTRACT

A powered wall mount includes a cover plate and a mount head in electrical communication with one another. The cover plate is configured to cover an electrical outlet in a wall without blocking any sockets. The cover plate includes a pair of resilient contacts that resiliently contact respective terminals of a pair of terminals of the electrical outlet upon mating of the cover plate with the electrical outlet. The mount head, which may be attached to the wall near the electrical outlet, includes a device mounting surface, at least one connector configured to hold a portable electronic device at the device mounting surface, and a power transfer mechanism configured to transfer power to the device when held at the device mounting surface. The connector(s) may be magnetic. Conveniently, the device may be attached to the mount head, used indefinitely while drawing power as needed, and then detached.

20 Claims, 12 Drawing Sheets

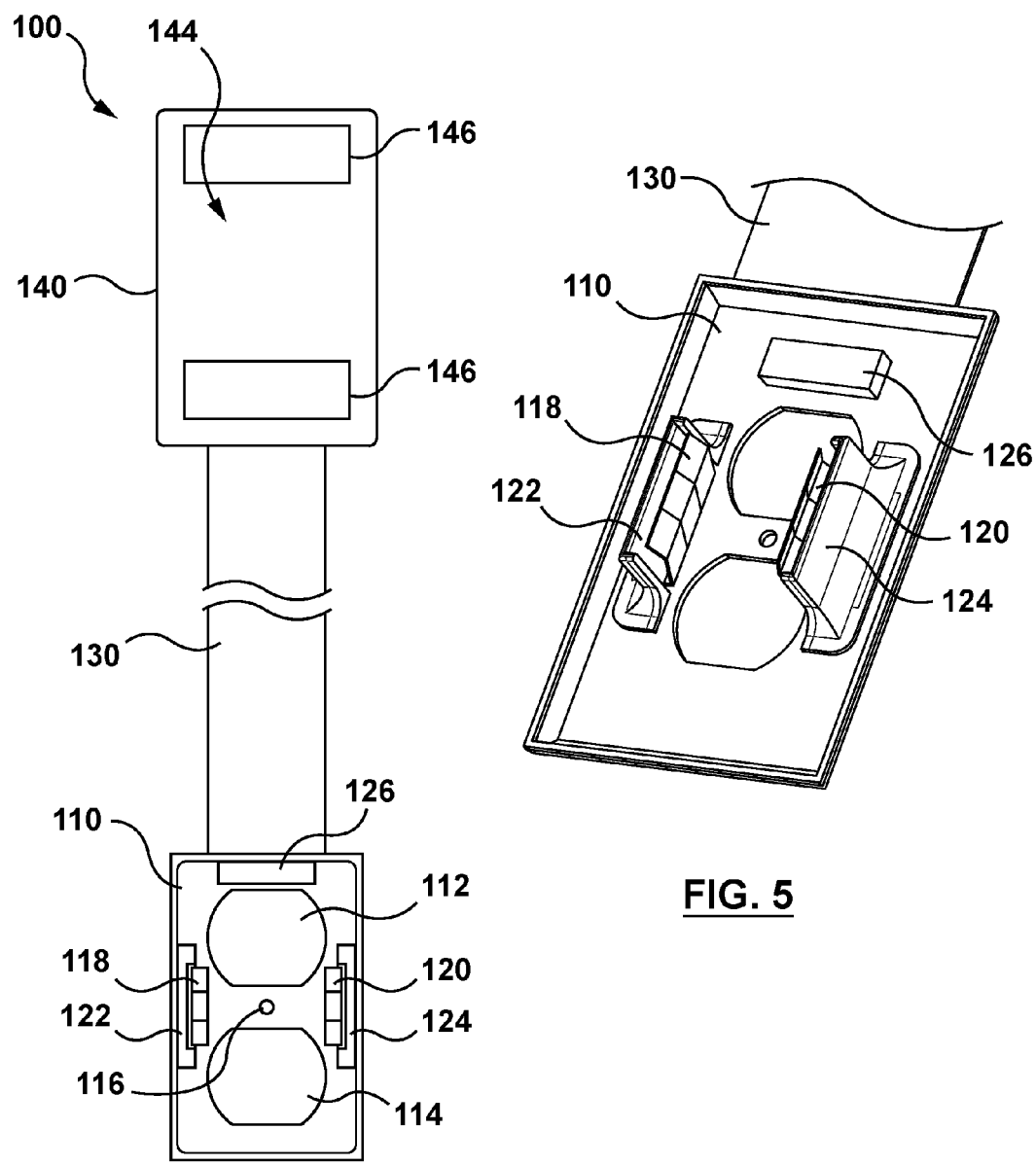

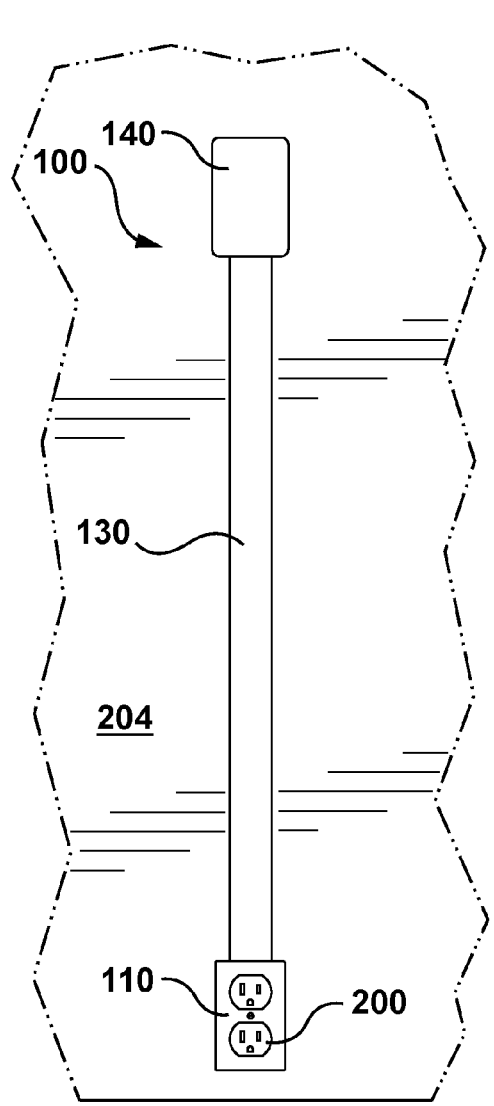
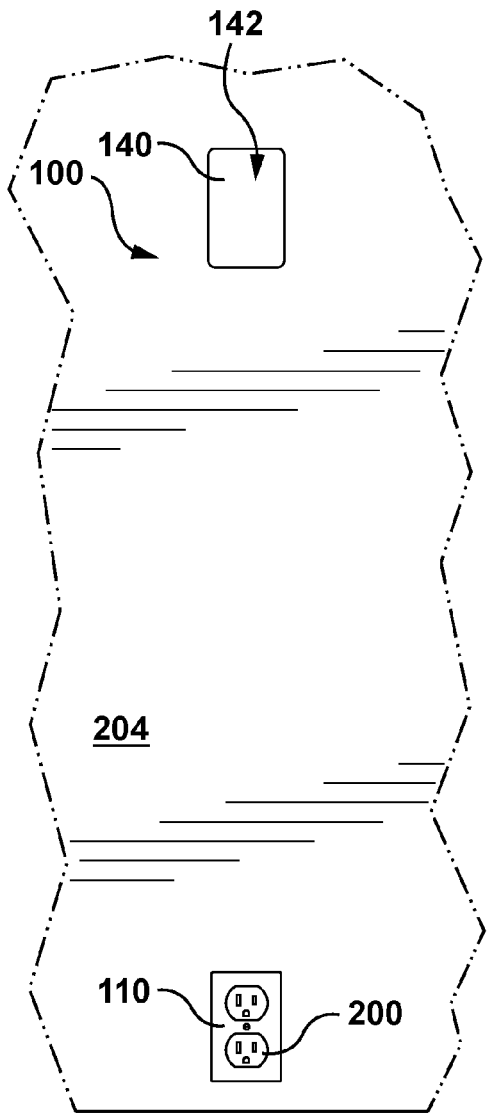
FIG. 8     FIG. 9

POWERED WALL MOUNT FOR A PORTABLE ELECTRONIC DEVICE

CROSS-REFERENCE TO RELATED APPLICATIONS

The present application claims the benefit of prior U.S. provisional application Ser. No. 62/464,959 filed Feb. 28, 2017. The present application also claims the benefit of prior U.S. provisional application Ser. No. 62/555,614 filed Sep. 7, 2017. The contents of both provisional patent applications is hereby incorporated by reference hereinto.

TECHNICAL FIELD

The present disclosure relates to wall mounts, and more particularly to a powered wall mount for a portable electronic device.

BACKGROUND

Battery-powered portable electronic devices, such as mobile phones (e.g. smartphones), handheld gaming devices, MP3 players, tablet computers, smart appliances or peripheral devices, have become ubiquitous. It is commonplace for users of such portable electronic devices to hold the devices during their use.

Portable electronic devices are typically powered by rechargeable batteries. To recharge the battery of a portable electronic device, a user may mechanically connect the device to a power adapter that is plugged into an electrical outlet. Alternatively, a user may place certain types of portable electronic devices onto a charging pad or dock for wireless recharging.

SUMMARY

An example powered wall mount for installation onto a wall at or near an electrical outlet comprises: a cover plate for covering the electrical outlet without blocking any sockets, the cover plate including a pair of resilient contacts configured to resiliently contact respective terminals of a pair of terminals of the electrical outlet upon mating of the cover plate with the electrical outlet, the pair of terminals for supplying the electrical outlet with mains power; a mount head including: a device mounting surface; at least one connector configured to hold a portable electronic device at the device mounting surface; and a power transfer mechanism configured to transfer power to the portable electronic device when held at the device mounting surface by the at least one connector; and power conversion circuitry in electrical communication with the pair of resilient contacts of the cover plate and with the power transfer mechanism of the mount head, the power conversion circuitry adapted to convert mains power supplied by the electric terminals into converted electric power for powering the power transfer mechanism.

An example kit for installing a powered wall mount onto a wall at or near an electrical outlet comprises: a cover plate for covering the electrical outlet without blocking any sockets, the cover plate having a pair of resilient contacts configured to resiliently contact respective terminals of a pair of terminals of the electrical outlet upon mating of the cover plate with the electrical outlet, the pair of terminals for supplying the electrical outlet with mains power; a mount head including: a device mounting surface; at least one connector configured to hold a portable electronic device at the device mounting surface; and a power transfer mechanism configured to transfer power to the portable electronic device when held at the device mounting surface by the at least one connector; power conversion circuitry associated with either the cover plate or the mount head, the power conversion circuitry adapted to convert mains power supplied by the terminals into converted electric power for powering the power transfer mechanism; and a power cable of customizable length for conducting either the mains power or the converted electric power from the cover plate to the mount head.

An example method of installing a powered wall mount, having a cover plate portion and a mount head portion in electrical communication with one another, onto a wall at or near an electrical outlet, comprises: mating the cover plate portion of the powered wall mount with the electrical outlet, the cover plate portion having a pair of resilient contacts configured to resiliently contact respective terminals of a pair of terminals of the electrical outlet upon the mating, the pair of terminals for supplying the electrical outlet with mains power; and affixing the mount head portion of the powered wall mount to the wall, the mount head portion having a device mounting surface, at least one connector configured to hold a portable electronic device at the device mounting surface, and a power transfer mechanism configured to transfer power to the portable electronic device when held at the device mounting surface by the at least one connector.

Other features will become apparent from the drawings in conjunction with the following description.

BRIEF DESCRIPTION OF THE DRAWINGS

In the figures which illustrate example embodiments:

FIG. 4 is a rear elevation view of the powered wall mount of FIG. 1;

FIG. 5 is a rear perspective view of a cover plate portion of the powered wall mount of FIG. 1;

FIG. 8 shows the powered wall mount of FIG. 1, in an installed state, in front elevation view;

FIG. 9 shows the installed powered wall mount of FIG. 8 with the power cable portion being hidden;

DETAILED DESCRIPTION

Figure 1:
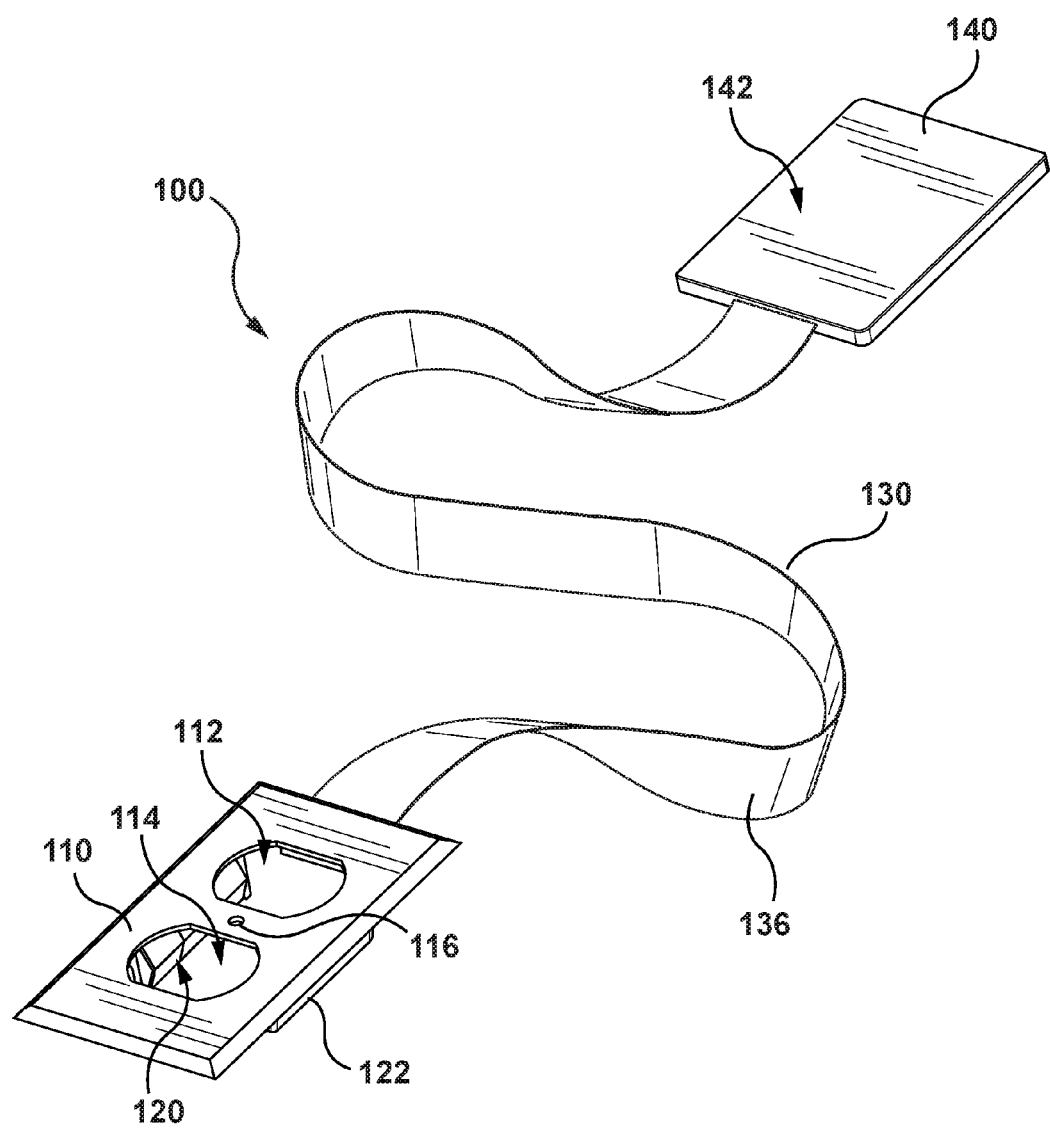
FIG. 1 is a perspective view of powered wall mount in an uninstalled state.
Figure 2:
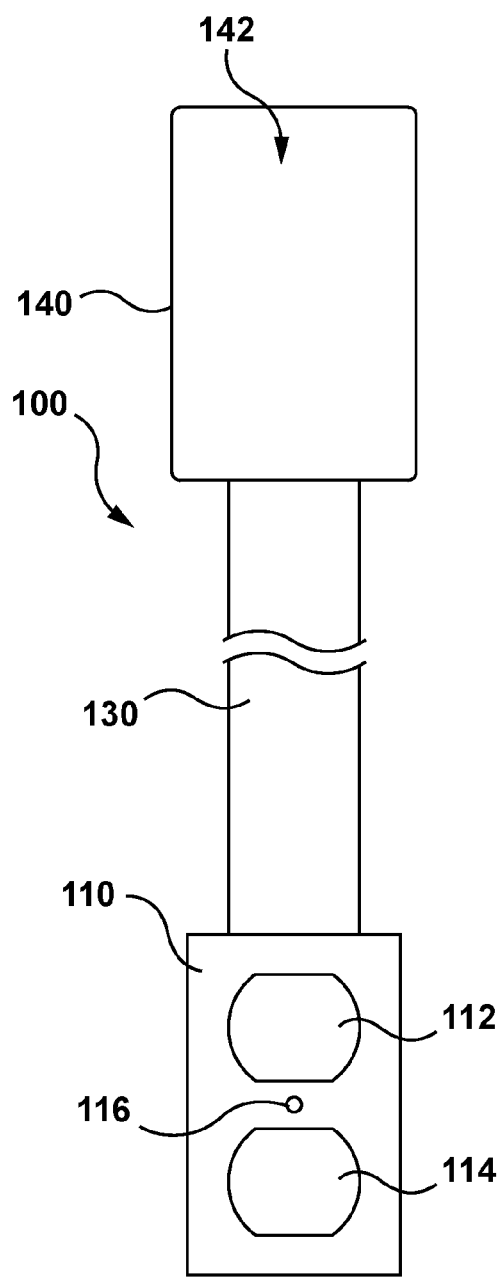
FIG. 2 is a front elevation view of the powered wall mount of FIG. 1.

In this disclosure, the terms "left," "right," "top," and "bottom" should not be understood to necessarily imply any required orientation of a device or component during use. Any use of the term "exemplary" should not be understood to mean "preferred."

The present disclosure describes various embodiments of a powered wall mount designed for easy installation on a wall at or near an electrical outlet or switch. The installed powered wall mount is intended to provide a convenient location for easy attachment of a portable electronic device to a wall and is capable of supplying the mounted (attached) portable electronic device with power. This may allow the mounted device to be used indefinitely, with its internal battery being recharged as needed. The wall mount also provides for easy detachment of the portable electronic device. The wall mount may accordingly facilitate convenient transitioning from hand-held or tabletop use of an electronic device to a wall-mounted use.

For clarity, the term "electrical outlet" (also referred to simply as an "outlet" or as an "electrical receptacle") as used herein refers to a device having at least one socket for receiving a plug of an electrical device and for supplying the electrical device with mains power. Electrical outlets are generally standardized for compatibility between outlets and plugs. For example, in North America, each socket of an electrical outlet may be designed to accommodate a three-pronged plug (including a "hot" prong, a "neutral" prong and a "ground" prong) or an older style two-pronged plug (lacking the "ground" prong) of predetermined dimensions. The configuration (e.g. size, shape and position) of the prongs and the sockets may be dictated by a standard, which may for example be a national standard as described the International Electrotechnical Commission (IEC) technical report TR 60083, *"Plugs and socket-outlets for domestic and similar general use standardized in member countries of IEC"*.

The term "mains power" as used herein refers to the type of alternating current (AC) electrical power that is generated by an electric utility and conveyed, via a power grid, to consumers, e.g. for powering home appliances such as lights, kitchen appliances (e.g. stoves), washers, and dryers. The two principal properties of mains power—voltage and frequency—vary from geographical region to region. For example, in North America, mains power typically has a voltage of 120 V and a frequency of 60 Hz. In contrast, mains power typically has a voltage of 230 V and a frequency of 50 Hz in regions such as Europe, much of Asia, much of South America and Australia.

The term "electrical switch" (or simply "switch") as used herein refers to a device that can be used to turn on or off (possibly incrementally) an electrical device, such as a light or appliance, that is powered by mains power. Electrical switches include toggle switches, 3-way switches, dimmer switches, and others. Like electrical outlets, electrical switches are typically standardized in terms of their physical and electrical specifications, e.g. according to a national standard (see above).

Electrical outlets and electrical switches are commonly installed in the walls of a building during construction or remodeling. In either case, an electrical box may be mounted to a stud or other framing member of a wall frame at a convenient height (e.g. a foot or so from the ground or above counter level in a kitchen or bathroom). Electrical wiring may be used to interconnect the electrical box with a source of mains electric power, such as an electrical panel. A wall covering such as drywall may then be attached to the wall frame in such a way that the interior of the electrical box is left exposed.

One or more electrical outlets and/or electrical switches may be installed within an electrical box, e.g. using screws. The screws may pass through openings in metal tabs at the top and bottom of the electrical outlet or switch. Electrical terminals (or simply "terminals") on the outlet or switch, which may take the form of screws on the side(s) of the outlet or switch, may then be attached to wires within the electrical box that supply the outlet or switch with mains power. For example, one terminal screw may attach a "hot" wire and another terminal screw may attach a "neutral" wire. Depending upon the type of electrical outlet or switch being installed, a third "ground" screw may also be provided for attachment to a ground wire. The position and dimensions of the electrical terminals may be standardized, although there may be some variability in their positions between manufacturers.

A cover plate having appropriate openings for exposing the socket(s) and/or switch control(s) may then be mated with and attached to the electrical outlet or electrical switch respectively using one or more screws. The attached cover plate covers the electrical box without blocking the socket (a) and/or switch control(s) and may give the wall a finished appearance.

Electrical outlets and electrical switches of the types described above may be referred to herein, generically or collectively, as electrical fixtures.

Referring to FIGS. 1, 2, 3 and 4, an exemplary powered wall mount 100 (or simply "mount" 100) is shown in front perspective view, front elevation view, front elevation view with certain internal or hidden components shown in dashed lines, and rear elevation view, respectively. A close-up rear perspective view of a cover plate portion of the mount 100 is provided in FIG. 5. For clarity, the powered wall mount 100 of FIGS. 1-5 is illustrated in an uninstalled state.

As illustrated, the powered wall mount 100 includes a cover plate 110, a power cable 130, and a mount head 140.

The cover plate 110 is designed to replace a conventional cover plate on a standard electrical outlet, such as a duplex National Electrical Manufacturers Association (NEMA) 125-Volt electrical outlet, and to draw power from the electrical outlet upon being mated with the outlet. As will be appreciated, it can be safely installed using only a screwdriver without disconnecting the outlet from mains AC power.

In many respects, the cover plate 110 is similar to the conventional cover plate that it is intended to replace. For example, the cover plate 110 is made from a non-conductive material and has two socket openings 112, 114. The openings 112, 114 align with and receive respective sockets of the duplex electrical outlet, e.g. so that the socket faces are substantially flush with the plate when the outlet and the cover plate 110 are mated. The cover plate 110 thus covers the electrical outlet but does not block any of its sockets, leaving them accessible for powering electrical devices. The cover plate 110 also has a hole 116, like a conventional cover plate, for attaching the cover plate 110 to the outlet using a screw.

Beyond these conventional features, the cover plate 110 additionally has a pair of resilient contacts 118, 120 extending rearwardly from its rear face (see FIGS. 4 and 5). The resilient contacts 118 and 120, which are made from electrically conductive material such as metal, are configured to resiliently contact two respective terminals of an electrical outlet (not depicted) with which the cover plate has been mated. The terminals, which may be screws, serve as points of attachment for wires that supply the electrical outlet with AC electric power. The contacts 118, 120 thus electrically contact the terminals of the electrical outlet, allowing the wall mount 100, and/or a portable electronic device mounted thereto, to draw power from the terminals.

In the illustrated embodiment, each contact 118, 120 has three outwardly curved, resilient tabs, perhaps best seen in FIG. 5, which are in mutual electrical communication. These may be considered as fingers of a metallic glove: if any finger contacts a terminal of the electrical outlet, then the entire glove will be in electrical contact with the terminal. In embodiments having such tabs, the number of tabs may vary between embodiments. Contacts 118, 120 may for example be substantially similar to the tentacular contacts described in U.S. Pat. No. 4,617,613 entitled Illuminated Electrical Outlet Cover Plate, the contents of which are incorporated herein by reference.

In the illustrated embodiment, contacts 118, 120 oppose one another (see e.g. FIGS. 4 and 5). Each contact 118, 120 is positioned to resiliently contact at least one hot terminal and at least one neutral terminal, respectively, of an electrical outlet with which the cover plate 110 has been mated.

A pair of rigid insulators 122, 124 (see e.g. FIG. 5) also extends rearwardly from the rear face of the cover plate 110. The insulators 122, 124, which may be made from plastic for example, partially sheath respective contacts 118, 120. The insulators 122, 124 may help to avoid unintended contact with, or short circuits due to, any exposed electrical wiring in an electrical box that houses an electrical outlet with which cover plate 110 has been mated. Insulators 122, 124 are not necessarily present in all embodiments.

Also visible on the rear face of the cover plate 110 is an AC-to-DC converter 126 (see e.g. FIGS. 4 and 5). The AC-to-DC converter 126 is a form of power conversion circuitry that converts mains AC electric power to DC electric power suitable for powering a portable electronic device attached at mount head 140. The characteristics of the DC electric power may vary between embodiments, e.g. possibly having a voltage of 1.5V, 5V, 12V, or 20V. The circuitry within AC-to-DC converter 126 may for example be adapted to perform AC-to-DC conversion using voltage conversion, rectification, and/or regulation.

The AC-to-DC converter 126 is in electrical communication with resilient contacts 118, 120 via conductors 119 and 121 respectively (see FIG. 3), which may be embedded within, or attached to a rear surface of, cover plate 110. The AC-to-DC converter 126 has an output for the DC electric power, which may for example comprise a pair of electrical contacts.

Figure 3:
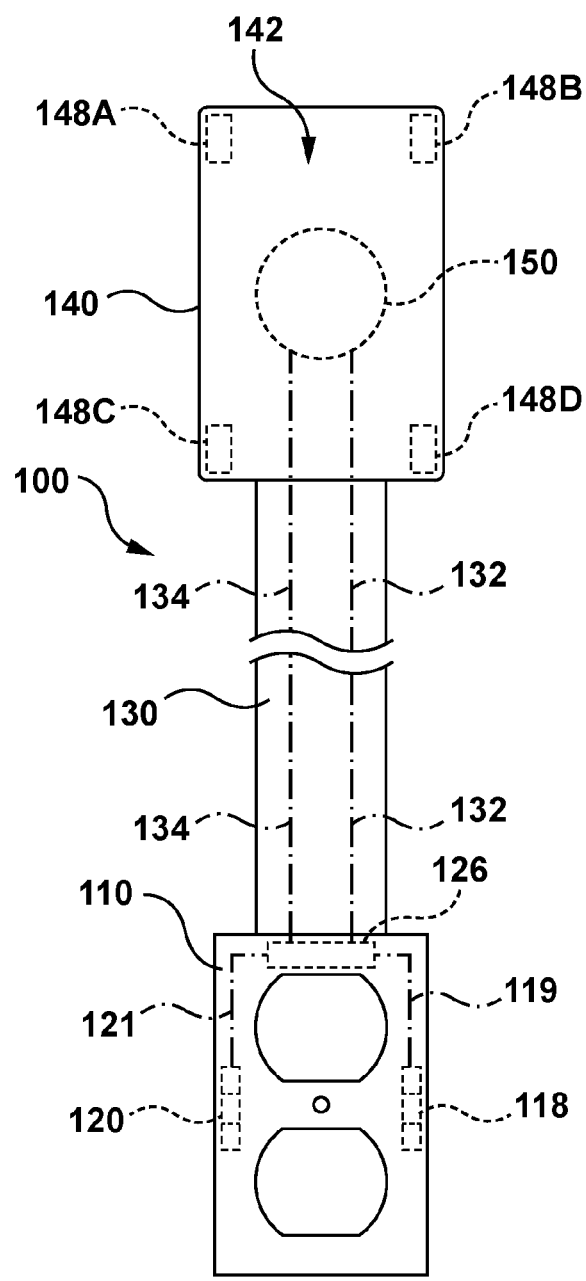
FIG. 3 is a front elevation view of the powered wall mount of FIG. 1 with certain internal or hidden components shown in dashed lines.

Power cable 130 (see e.g. FIGS. 1-4) electrically connects cover plate 110 with mount head 140. The cable 130 includes at least two insulated conducting wires 132, 134 (FIG. 3). In the present embodiment, the conducting wires 132, 134 are electrically connected to the output of AC-to-DC converter 126 of cover plate 110 and are adapted to conduct (suitable, e.g. in gauge, rating and/or electrical conductivity, for safely conducting) the DC electric power produced thereby. The gauge of the wires may for example be 14 American Wire Gauge (AWG), 16 AWG, or 18 AWG.

The length of power cable 130 (see e.g. FIG. 1) is selected so that, upon installation of the powered wall mount 100, the mount head 140 will be at a desired height, e.g. at eye or chest level of an intended user. As such, the length may depend upon an anticipated height of the electrical wall outlet to which the cover plate 110 is expected to be attached. Although power cable 120 is depicted as straight, it could also include bends, e.g., to route to a desired position of mount head 140 relative to the electrical outlet. In some embodiments, the length may be customizable, as described below.

Figure 6:
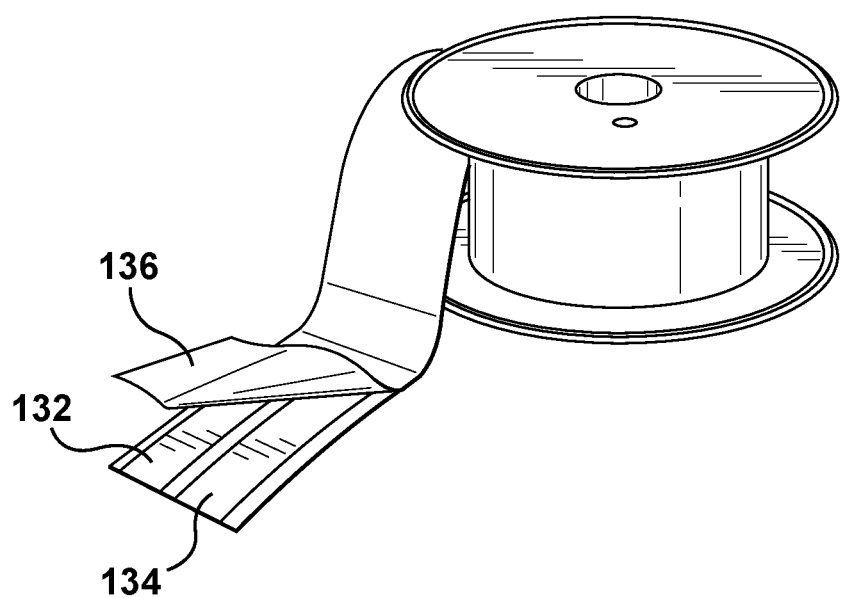
FIG. 6 is a perspective view of a spool of a type of flat electrical cable that may be utilized in a power cable portion of the powered wall mount of FIG. 1.

In the illustrated embodiment, the power cable 130 is designed to be inconspicuous when adhered to a wall. As such, the cable is substantially flat and thin (e.g., less than 0.5 millimeters (mm) in thickness). The conductors 132, 134 may accordingly be thin metal strips. In some embodiments, the power cable 130 may be so thin that, once it has been attached to the wall, it can be painted over to hide it from view. The power cable 130 may, for example, be a length of Ghost Wire™ from Sewell™ (see FIG. 6). In some embodiments, the cable 130 may have an adhesive backing on its rear face, covered by a peel-away liner 136, to facilitate installation. The adhesive backing may cover the entirety of the wall-facing side of the power cable 130, including both conductors 132, 134. As such, the cable 130 may be stuck to a wall much like conventional sticky tape.

The mount head 140 is the interface point between the powered wall mount 100 and a portable electronic device. In the present embodiment, the mount head 140 has a substantially flat cuboid shape, with a front face having a rounded rectangle shape (see FIG. 1). The mount head 140 has a device mounting surface 142 to which a portable electronic device can be selectively mounted (attached), with the portable electronic device typically (but not necessarily) being held in a vertical orientation. In the present embodiment, the device mounting surface 142 is substantially flat and has a generally rectangular shape. The color of mount head 140 may be selected to blend into the wall once installed.

The mount head 140 incorporates at least one connector configured to hold a portable electronic device at the device mounting surface during use. For example, when the device mounting surface is vertical upon installation of the mount, the at least one connector should be configured to hold the portable electronic device vertically against the surface during use. In such embodiments, the connector(s) may be configured to bear the weight of the device. In the illustrated embodiment, the mount head 140 contains four like connectors 148A, 148B, 148C and 148D (see FIG. 3) disposed in the four corners the mount head 140 beneath the device mounting surface 142. The four connectors 148A-D may be referred to generically or collectively as connector(s) 148. The number and placement of connectors may vary in alternative embodiments.

In the present embodiment, the connectors 148 are magnetic connectors, e.g. of the type described in co-owned International PCT publication WO 2015/070321 and U.S. Pat. No. 9,312,633, which are incorporated hereinto by reference. The magnetic connectors may be used to provide a mechanical coupling function between devices and, in some embodiments, an electrical connection function for data and/or power transfer between the devices. The placement of the connectors 148 in mount head 140 may match that of complementary magnetic connectors in a portable electronic device. The magnetic connectors 148 may incorporate permanent magnets, electro-magnets, or magnetic ferrous elements, suitable for magnetically engaging complementary magnetic connectors of portable electronic device and thereby holding the portable electronic device to mount head 140 at the device mounting surface 142 in an orientation that is suitable for the intended use of the device (e.g. vertically or horizontally).

The rear face 144 of the illustrated mount head 140 (see e.g. FIG. 4) has adhesive strips 146 with a peel-away lining to facilitates tool-free adhesion of the mount head 140 to a wall during wall mount installation. The adhesive strips 136 may use a mounting adhesive that allows for easy application and removal without leaving marks or residue, e.g., 3M™ Command™ strips. The use of such a mounting adhesive may facilitate wall mount de-installation.

The mount head 140 further includes a power transfer mechanism configured (e.g. by its size, shape, electrical properties or placement) to supply electric power to the portable electronic device when it is held at the device mounting surface 142. The power transfer mechanism 150 is powered by the DC electric power from AC-to-DC converter 126.

In the present embodiment, the power transfer mechanism 150 is a wireless Qi™ charging transmitter, which is a form of inductive charging transmitter. The example particular power transfer mechanism 150 is designed to automatically supply power, via induction, to any complementary receiver that is within range. In alternative embodiments, the power transfer mechanism may require manual activation when the portable electronic device is mounted.

The example transmitter 150 of the illustrated embodiment is situated within mount head 140 for alignment with a complementary receiver in a mounted portable electronic device. For example, magnetic engagement of connectors in the mount head 140 and a portable electronic device may result in alignment of complementary wireless transmission components in the respective devices, e.g., in manners described in U.S. application Ser. No. 15/282,907, entitled "FACILITATING ALIGNMENT OF TRANSMIT AND RECEIVE ANTENNAS FOR ULTRA SHORT RANGE WIRELESS INTERACTION", which forms Appendix A of U.S. provisional application Ser. No. 62/464,959, incorporated herein by reference above.

As may now be appreciated, the design of powered wall mount 100 facilitates easy installation and de-installation, e.g. without in-wall rewiring, at or near an electrical outlet. The term "at or near" connotes the fact that, although the cover plate portion covers the electrical outlet, the mount head portion will be offset from the electrical outlet by some distance (which may vary between embodiments). In a typical embodiment, the offset is intended to situate the mount head above the outlet at eye level. Installation of powered wall mount 100 may be performed as follows.

Figure 7:
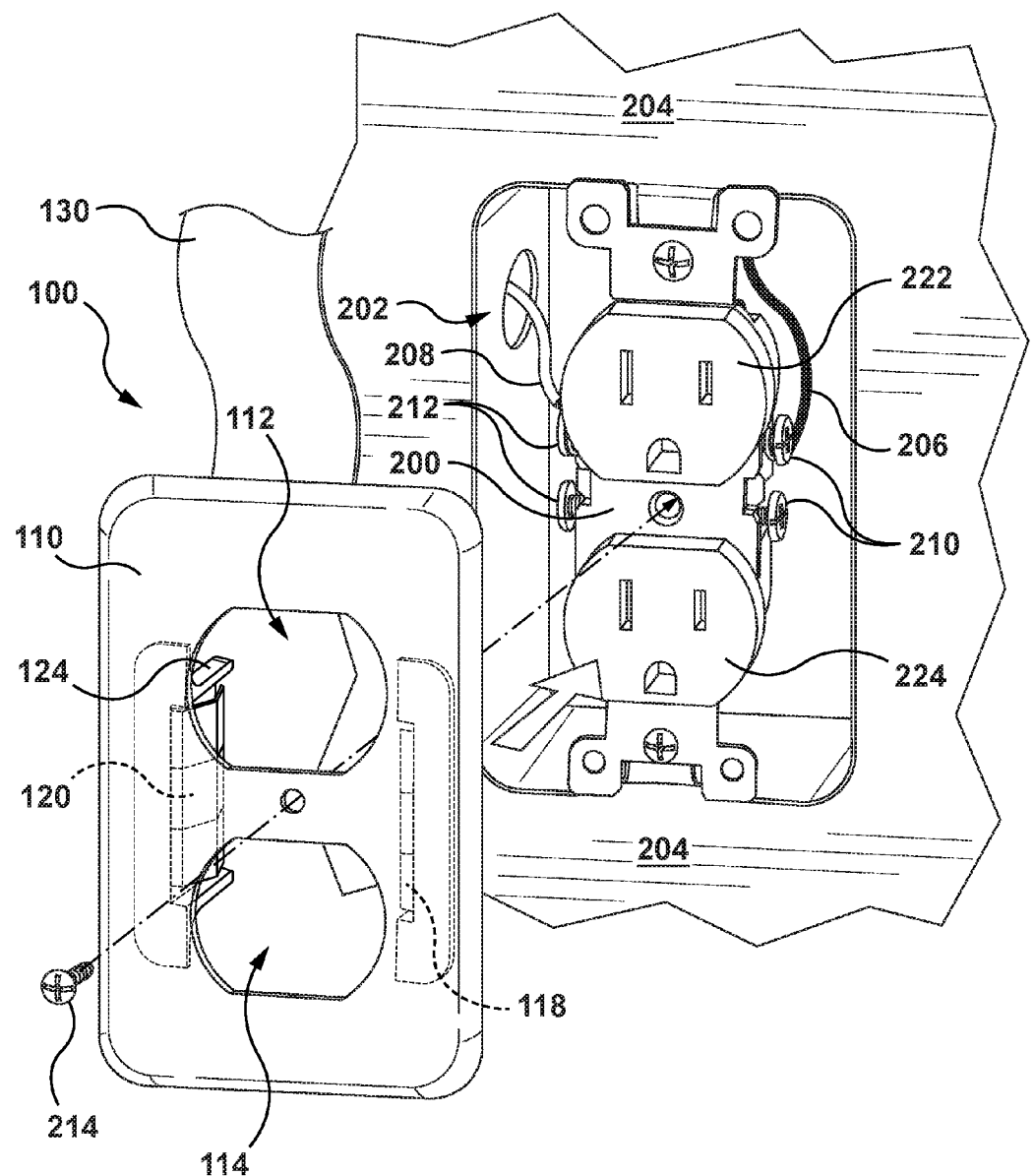
FIG. 7 depicts, in perspective view, the mating of a cover plate portion of the powered wall mount of FIG. 1 with an electrical outlet during wall mount installation.

Referring to FIG. 7, a conventional cover plate (not depicted) may initially be removed to expose a duplex electrical outlet 200 housed in electrical box 202 in a wall 204. The electrical outlet 200 in this example is "hot," i.e. is connected to mains power. More specifically, a "hot" wire 206 is electrically connected to either one of a pair of "hot" screw terminals 208, and a "neutral" wire 208 is electrically connected to either one of a pair of "neutral" screw terminals 212.

The cover plate 110 portion of the wall mount 100 is then mated with the electrical outlet 200, with sockets 222, 224 being received in openings 112, 114 respectively. When this is done, the resilient electrical contacts 118 and 120 will be biased against terminals 210 and 212 respectively and will accordingly establish electrical connections therewith. Conveniently, the user is protected from electrical shock by the non-conductive body of cover plate 110. The mated cover plate 110 may then be attached to the electrical outlet 200 using a conventional screw 214.

Thereafter, the power cable 130 can be adhered flat against the wall 204, and mount head 140 can be affixed to a wall at a desired height, e.g. at eye-level. In the present embodiment, the mount head 140 is affixed using adhesive strips 146 (FIG. 4). In the result, the installed powered wall mount 100 may appear as depicted in the front elevation view of FIG. 8.

If desired, the power cable 130 may be painted over to hide it from view, as depicted in the front elevation view of FIG. 9. Optionally, a cavity (not expressly depicted) may be provided in the wall 204 to receive mount head 140 so that the front-facing device mounting surface 142 is flush with the wall. Like power cable 130, the mount head 140 may be painted over to hide it from view. Since cover plate 110 may be indistinguishable from a conventional cover plate, hiding the mount head 140 and power cable 130 may be sufficient to visually blend the wall mount 100 into the surrounding wall 204. If the mount head is entirely hidden from view, it may be positioned in a predetermined location with respect to one or more other wall features, e.g., each wall mount may always be positioned on the right side of a light switch.

In some embodiments, the mount head may be flush with the wall but not completely hidden to facilitate its location by a user. For example, the mounting surface may be painted a different color from the surrounding wall, or the mount head may include a light emitting device (e.g. an LED) that shines light through the paint, to facilitate its location by a user. Other location indicators may be used.

Figure 10:
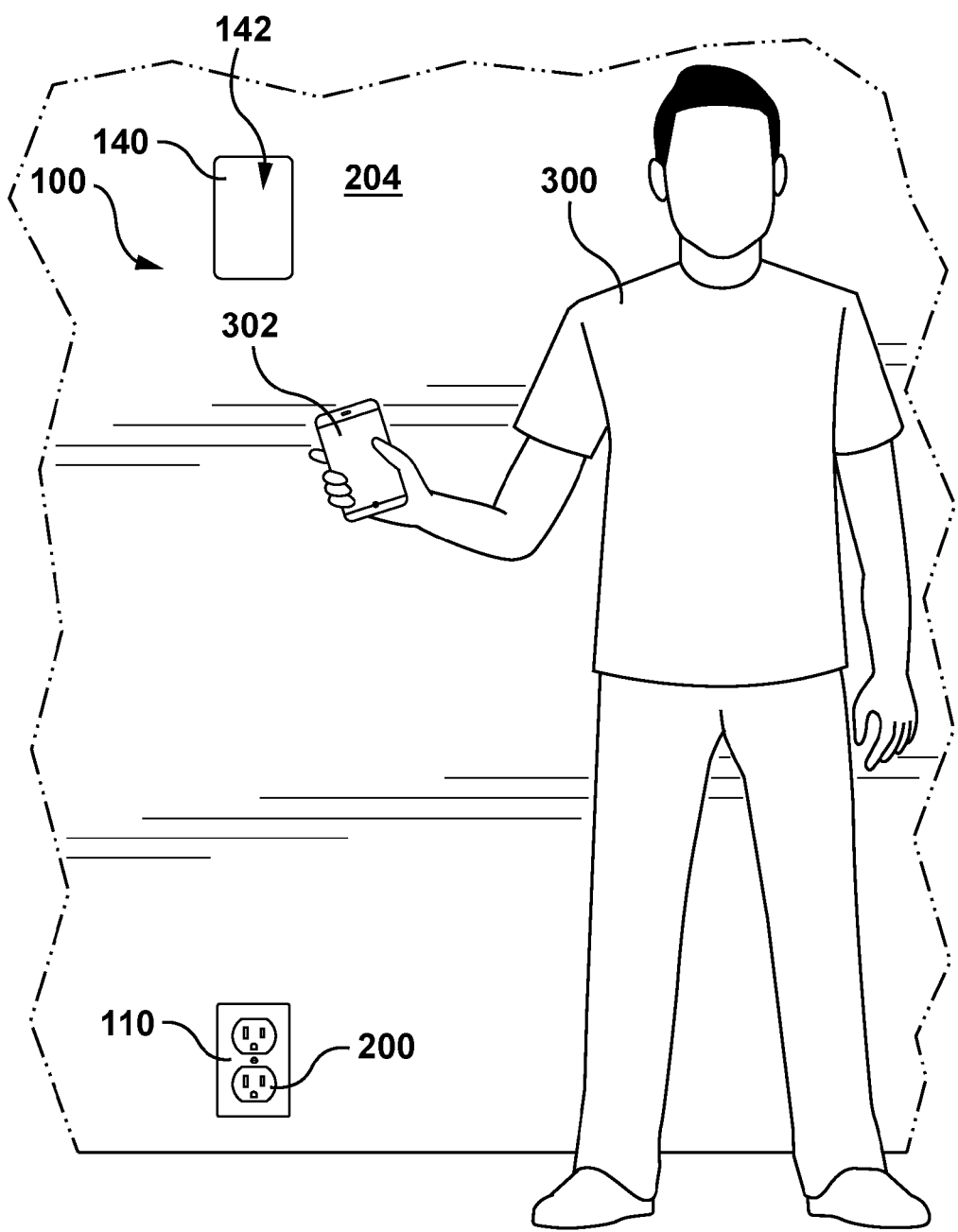
FIGS. 10 and 11 depict use of the installed powered wall mount of FIG. 9.
Figure 11:
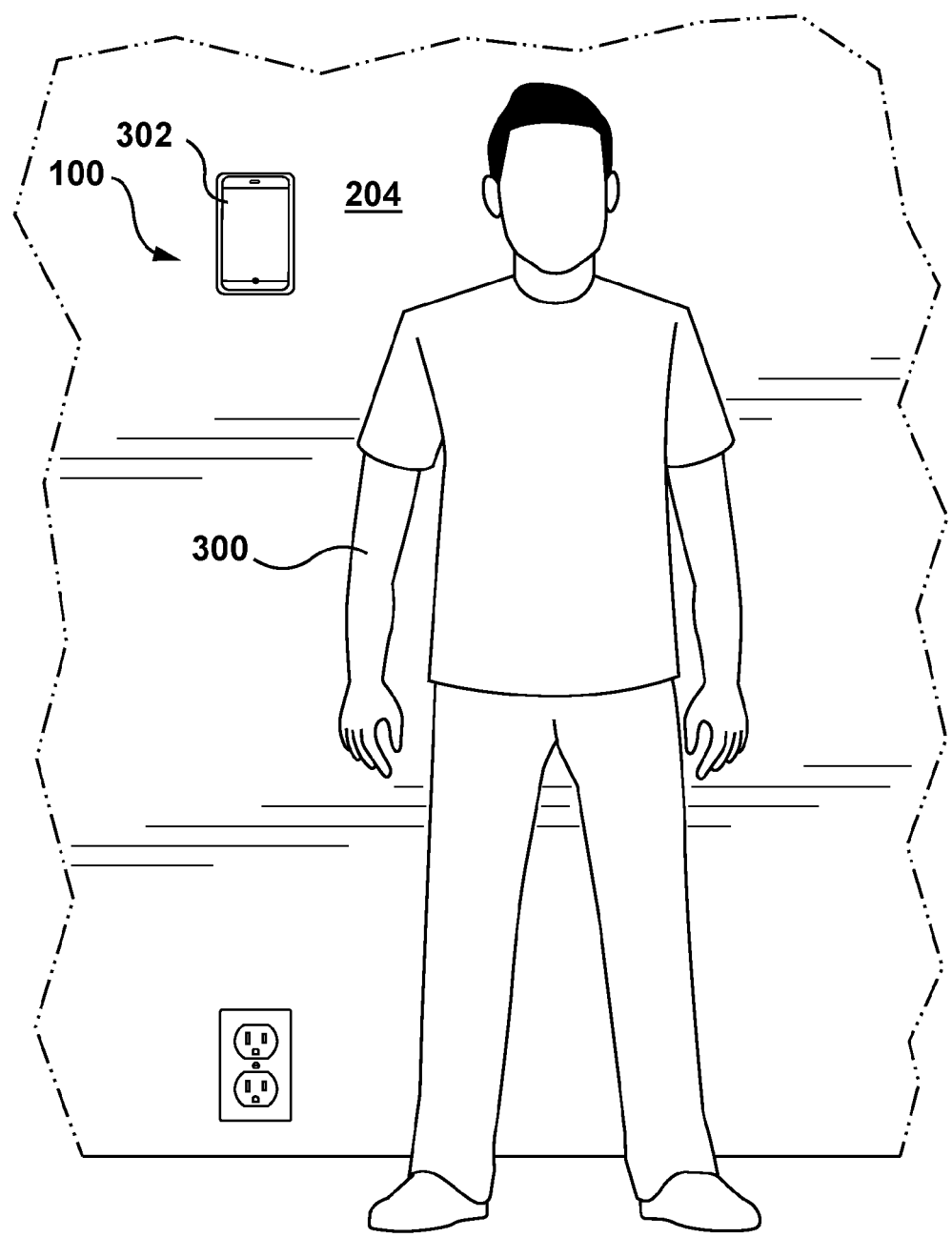

To use the installed wall mount 100, a user 300 (FIG. 10) may hold a portable electronic device 302 so that its rear surface is at or near the front-facing device mounting surface 142 of mount head 140 in wall 204. When the magnetic connectors 148 (FIG. 3) engage with complementary connectors in the portable electronic device 302, the portable electronic device 302 will be held at the device mounting surface 142, e.g. in a vertical orientation (see FIG. 11). When held against the device mounting surface 142, the device 302 is said to be in a "mounted" state. Notably, a user interface of the mounted device 302 (e.g. one or more of a display, touchscreen, speaker, button(s), and microphone) may remain accessible to the user 300, providing for continued, convenient use of the mounted device 302 at a fixed position on the wall. Meanwhile, the power transfer mechanism 150 (FIG. 3) automatically supplies electric power to the mounted portable electronic device as necessary, e.g. to supply the device with power and/or charge its battery.

When the user has finished using the mount 100, the device 302 may be dismounted by pulling it away from mount head 140 sufficiently to overcome the force exerted by the magnetic connectors 148. The strength of the magnetic connectors may be chosen to afford a good compromise between ease of detachment and reliable holding of the portable electronic device when mounted.

The embodiments described above presume that installation of a powered wall mount 100 with a predetermined length of power cable 130 will situate the mount head 140 at a height desired by the user, e.g. at eye level. Yet it is unlikely that a single length of cable will satisfy all users universally, e.g. due to variability in electrical wall outlet height or user height. Therefore, some embodiments of powered wall mount may permit the length of the power cable 130 to be customized.

Figure 12:
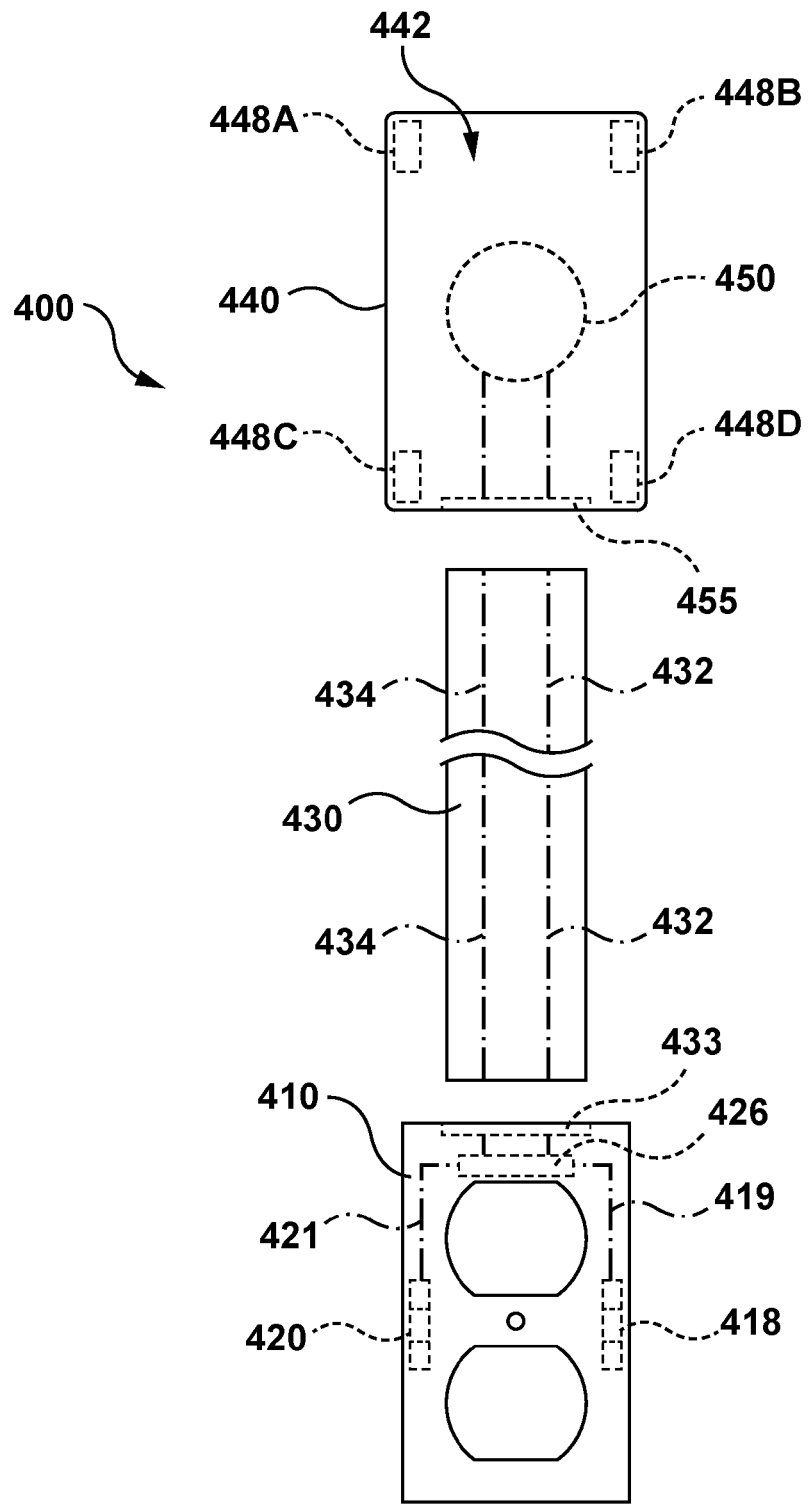
FIG. 12 shows a kit for installing a powered wall mount in top plan view.

For example, FIG. 12 depicts a kit 400 for installing a powered wall mount. The kit 400 is shown in top plan view, e.g. with the various components of the kit laid on a flat surface and viewed from above. Dashed lines are used to illustrated features that are internal or hidden from view.

As illustrated, the kit 400 includes three components: a cover plate 410, a power cable 430, and a mount head 440.

The cover plate 410 is, in most respects, identical to the cover plate 110 of FIGS. 1-5, described above. For example, the cover plate 110 has tentacular electrical contacts 418, 420, electrical conductors 419, 421, and AC-to-DC converter 426 whose structure and interconnections are identical to those of counterpart components 118, 120, 119, 121 and 126, respectively, of FIG. 3. However, unlike cover plate 110, the cover plate 410 of FIG. 12 includes a terminal block 433 for attaching one end of power cable 430 to the cover plate 110 for electrical communication with the output of AC-to-DC converter 426.

The power cable 430 component of kit 400 is identical to the power cable 130 of FIGS. 1-4, with the exception that the cable 430 is initially unconnected to either of cover plate 410 or mount head 440. This allows either end of the cable 430 to be cut to achieve a desired cable length.

The mount head 440 component is in most respects identical to the mount head 140 of FIG. 3. For example, the mount head 440 has four magnetic connectors 448A-D disposed in its four corners and a power transfer mechanism 450 that may be a Qi™ charging transmitter. However, unlike mount head 140, mount head 440 has a terminal block 455 for attaching the other end of power cable 430 for electrical communication with the power transfer mechanism 450.

Figure 13:
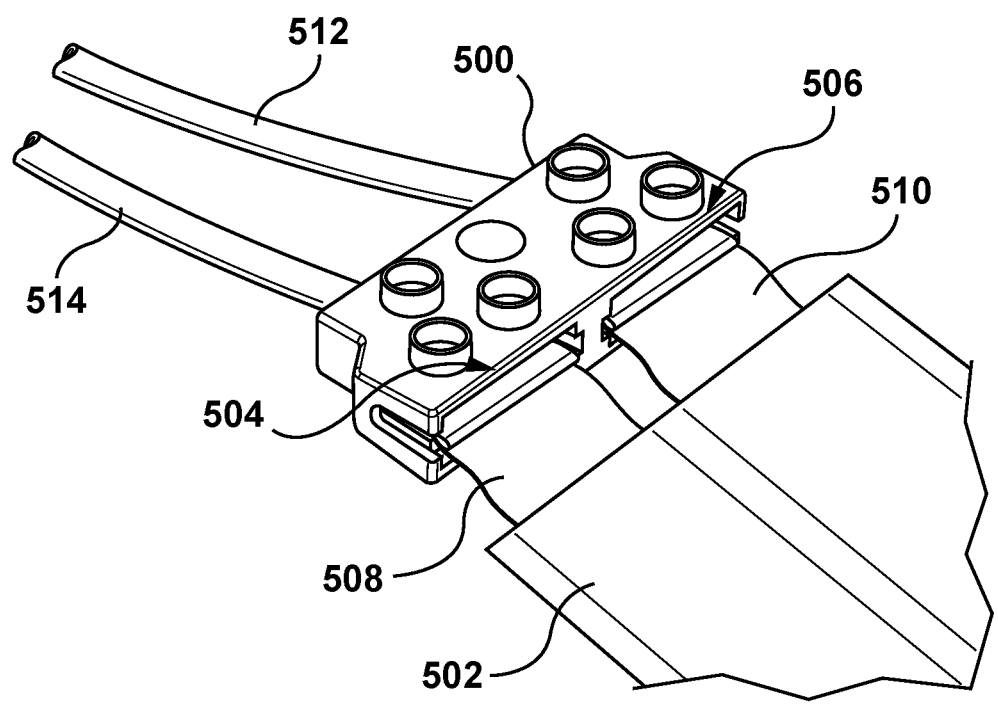
FIG. 13 is a perspective view of a terminal block that may form part of either or both of a cover plate component and a mount head component of the kit of FIG. 12.

The terminal blocks 433, 455 may for example be of the type depicted in FIG. 13. Referring to FIG. 13, an example terminal block 500 for use with a flat power cable 502, such as Sewell™ Ghost Wire™, is shown in perspective view. The terminal block 500 has two terminals 504, 506 into which the exposed ends 508, 510 of electrical conductors comprising power cable 502 can be inserted. The ends may then be crimped or clamped (e.g. using screws) in place to establish an electrical connection with conductors 512 and 514 respectively.

Installation of a powered wall mount using kit 400 is similar to the installation of powered wall mount 100, described above. An exception is that the power cable 430 may be cut to whatever length is needed for the desired height of mount head 440 before being electrically connected to the mount head 440 and to the cover plate 410 using terminal blocks 455 and 433, respectively. Indeed, since the powered wall mount can be easily installed and de-installed (e.g. because some of its components may be adhered to the wall using removable adhesive strips), various installation positions can be tested and evaluated for convenience. Once a final installation position has been selected, the power cable 430, and possibly the mount head 440, can be painted over.

In an alternative embodiment of kit 400, the power cable 430 may already be electrically attached to either cover plate 410 or to mount head 440 at the outset, with only one end being free. The free end of the cable may be trimmed to achieve a desired cable length and then attached to the other one of cover plate 410 or mount head 440 during installation, e.g. using a terminal block 500 as shown in FIG. 13. This approach may facilitate installation in comparison to kit 400, because the user need only make one terminal block connection rather than two.

In each of the powered wall mount embodiments described above, the cover plate and the mount head are separate pieces electrically interconnected by a power cable. In alternative embodiments, the power cable may be omitted and the cover plate and the mount head can be integrated, i.e. may be combined into, or formed as, a single piece. Such an embodiment is illustrated in FIGS. 14 and 15.

Figure 14:
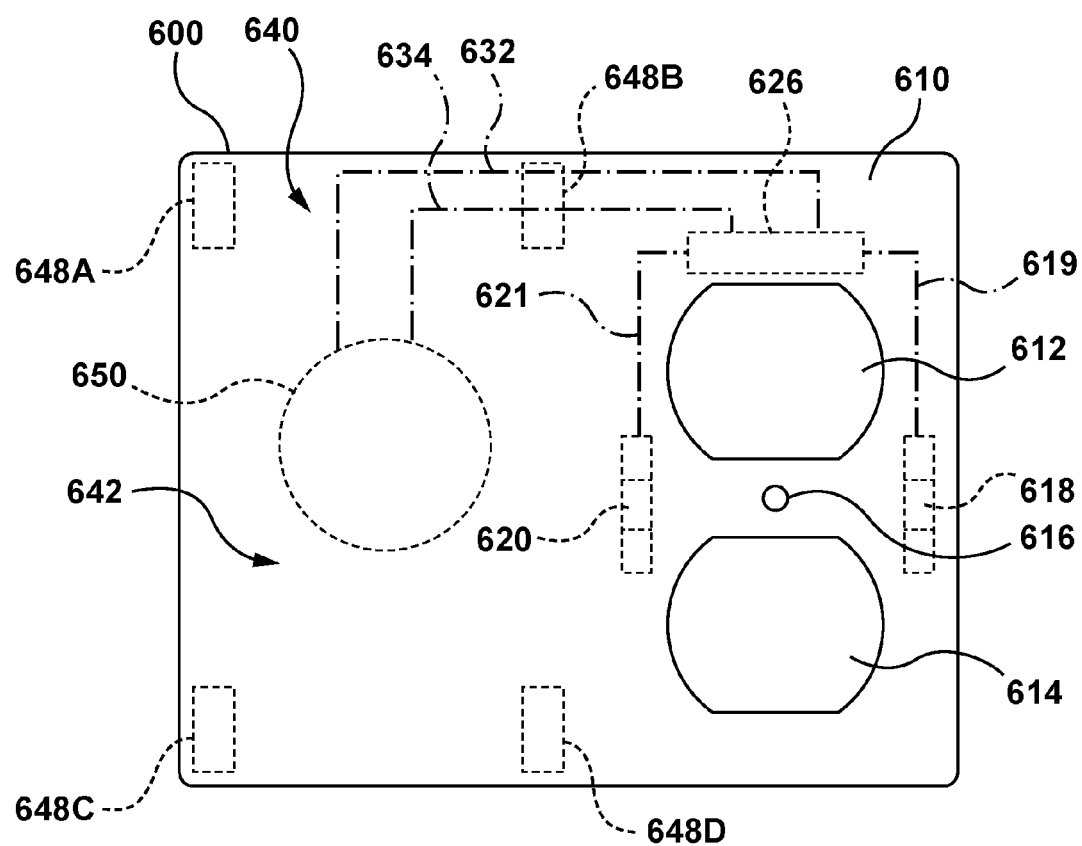
FIG. 14 is a front elevation view of an alternative, one-piece powered wall mount, in an uninstalled state, with certain internal or hidden components shown in dashed lines.
Figure 15:
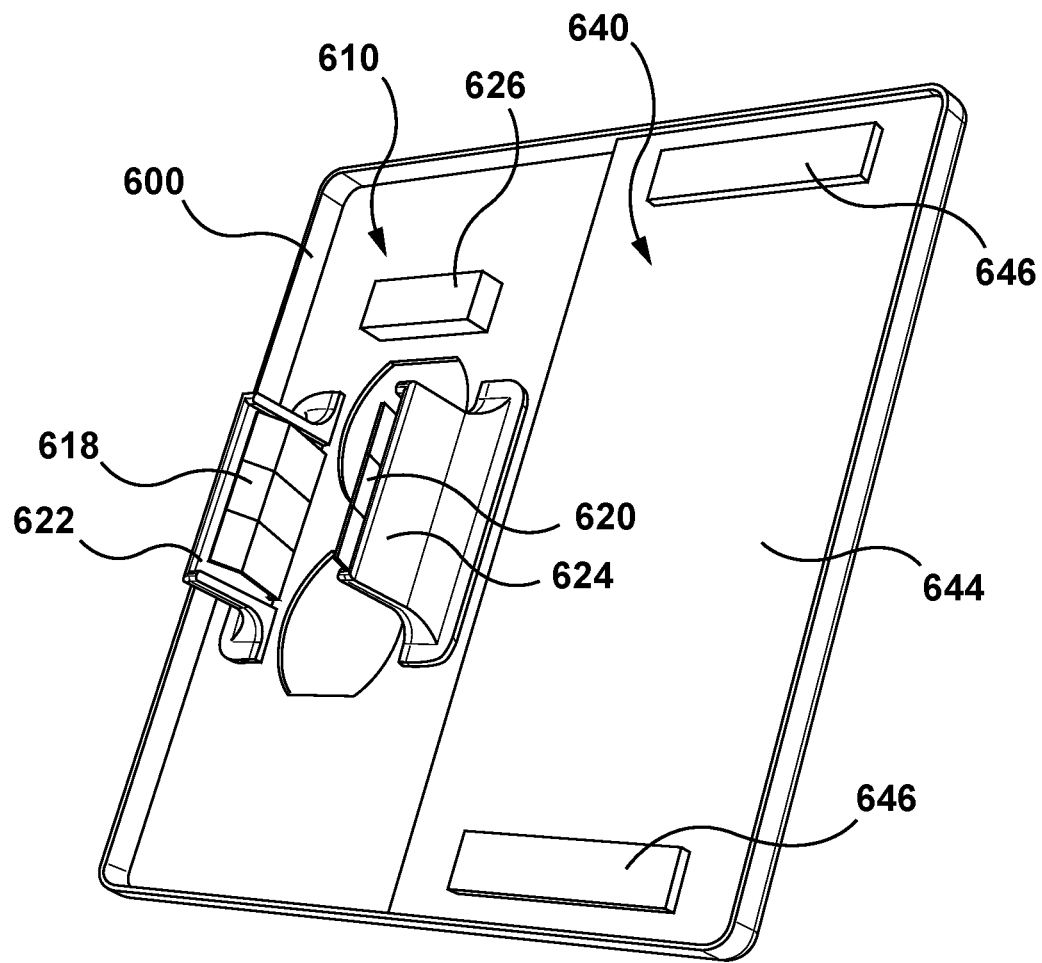
FIG. 15 is a rear perspective view of the uninstalled powered wall mount of FIG. 14.

Referring to FIGS. 14 and 15, an exemplary integrated (single-piece) powered wall mount 600 is depicted in front elevation view and rear perspective view, respectively, with certain internal or hidden components being shown in dashed lines in FIG. 14. The exemplary powered wall mount 600 is substantially rectangular and has a cover plate portion 610 and a mount head portion 640.

The cover plate portion 610, which is on the right side of FIG. 14 and the left side of FIG. 15, is configured for mating with a conventional duplex electrical outlet. It has a pair of openings 612, 614 for respective sockets and a hole 616 for receiving a screw for attaching the cover plate portion 610 (and thus wall mount 600) to the electrical outlet. A pair of tentacular, resilient contacts 618, 620, similar to contacts 118, 120 described above, extends rearwardly from the rear face of the mount 600 (see FIG. 15). The contacts 618, 620 are partially sheathed by rigid insulators 622, 624, similar to insulators 122, 124 described above.

An AC-to-DC converter 626, similar to AC-to-DC converter 126 described above, is disposed on a rear face of the cover plate portion 610 of mount 600. The AC-to-DC converter 626 is in electrical communication with resilient contacts 618, 620 via conductors 619 and 621 respectively (see FIG. 14). Conductors 619, 621 may be embedded within, or attached to a rear surface of, cover plate portion 610.

The mount head portion 640 of wall mount 600 (on the left and right sides of FIGS. 14 and 15, respectively) has a substantially flat cuboid shape (see FIG. 15) with a substantially flat, front-facing device mounting surface 642 (see FIG. 14). The mount head portion 640 incorporates four connectors 648A, 648B, 648C and 648D, which are referred to generically or collectively as connector(s) 648. The connectors 648, which may be magnetic connectors similar to connectors 148 described above, are disposed beneath the device mounting surface 642 in the illustrated embodiment. The number, type and placement of connectors may vary in alternative embodiments.

A power transfer mechanism 650, which may be similar to power transfer mechanism 150 described above, also forms part of (e.g. is embedded within) the mount head portion 640. Adhesive strips 646 on the rear face 644 of the mount head portion 640 (see FIG. 15), which may be similar to adhesive strips 146 described above, may be provided to help to attach the mount 600 to a wall upon installation. The number, placement and type of adhesive strips may vary between embodiments.

A pair of conductors 632, 634 carry DC electric power from the AC-to-DC converter 626 to the power transfer mechanism 650 in lieu of a power cable.

Installation of the powered wall mount 600 is similar to installation of mount 100, described above. An exception is that the mating of the cover plate portion 619 with the electrical outlet and the attachment of the mount head portion 640 to the immediately adjacent wall are performed substantially simultaneously. Another exception is that no power cable need be adhered to the wall or hidden from view. As such, a user may consider installation of mount 600 to be more straightforward than installation of mount 100 or of kit 400.

It will be appreciated that the exemplary wall mount 600, once installed, will be attached to the wall at three points: via a screw through hole 616 and by each of the two adhesive strips 646. It will further be appreciated that the mount head portion 640 will be positioned at the same height as the electrical outlet, immediately adjacent thereto. As such, this type of one-piece wall mount 600 may be best suited for installation at electrical outlets that are at least at waist height, e.g. above a counter in a kitchen.

It will be appreciated that the relative positions of the cover plate portion and the mount head portion may vary in alternative integrated powered wall mounts. In some embodiments, the mount head portion may be above or below the cover plate portion rather than side-by-side with the cover plate portion.

Various other alternative embodiments are possible.

In the powered wall mount embodiments described above (e.g. mount 100), the power conversion circuitry (e.g. AC-to-DC converter 126) is associated with the cover plate portion of the mount (e.g. is attached to or embedded within the cover plate). In such embodiments, the power cable may be adapted to conduct the resultant DC electric power, e.g. may have a gauge or rating suitable for safely conducting the resultant DC electric power voltage and/or current. In alternative embodiments, the power conversion circuitry could instead be associated with the mount head portion of a wall mount, and the power cable may be adapted to conduct mains power. In such embodiments, the power cable may be thicker, e.g. with a higher gauge of conducting wires to safely conduct mains power (versus lower voltage DC power), and thus may be more difficult to conceal.

In some embodiments, the connector(s) in the mount head may be selectively activatable for holding a portable electronic device at the device mounting surface only when one or more conditions has (have) been met. Using powered wall mount 100 as an example, the connectors 148 of mount head 140 may comprise electromagnets that become activated by logic comprising wall mount 100 or another device in communication therewith. The conditions may for example include receiving an appropriate code, such as an authorization code, a password, or a device ID, from the device 302. In such embodiments, the mount head may include electronics and logic to implement one or more handshaking protocols with the portable electronic device, to permit communication between the mount head and the device. Wireless communication may for example be performed via complementary wireless transmission components in portable electronic device and the mount head respectively, which may become aligned when magnetic connectors achieve a connected state, e.g. as described in the above-referenced U.S. application Ser. No. 15/282,907, entitled "FACILITATING ALIGNMENT OF TRANSMIT AND RECEIVE ANTENNAS FOR ULTRA SHORT RANGE WIRELESS INTERACTION," which forms Appendix A of U.S. provisional application Ser. No. 62/464,959, which is incorporated by reference above.

In another example, the mount head may include electronics and logic to implement various handshaking protocols with the portable electronic device. Using such protocols, the mount head may transmit data (e.g., location coordinates or a unique ID) that allows portable electronic device to uniquely identify the wall mount 100 to which it has been mounted. The portable electronic device may in turn execute code according to such identification. For example, portable electronic device may display an interface for controlling a light in a given room when it determines that it has been mounted to a mount 100 in that room. International Application No. PCT/CA2016/051359, entitled "AUTOMATED NOTIFICATION REGARDING HYBRID ELECTRONIC DEVICES CONSTRUCTIBLE FROM MAGNETICALLY INTER-ATTACHABLE ELECTRONIC DEVICES", which is provided as Appendix B of U.S. provisional application Ser. No. 62/464,959, incorporated by reference above, describes the formation of a hybrid device upon magnetic interconnection of multiple devices. The mount 100 may replace the wall mount 220 described in that application.

The connectors for holding a portable electronic device at the device mounting surface of the mount head need not necessarily be magnetic connectors. Alternative types of connectors, including mechanical connectors like spring clips, slots, or friction fit type connectors, may be used. Regardless of type, the number of connectors need not be four as shown in FIGS. 3, 12 and 14. A lesser or greater number of connectors may be used. The connectors need not necessarily be disposed beneath the device mounting surface, and instead may be at, above or adjacent thereto. Regardless of their type, number or placement, the connector(s) should support the weight of the portable electronic device and keep the device sufficiently stable to permit a user to interact with the portable electronic device conventionally using device-specific user input mechanisms, e.g. touchscreens or voice commands.

The device mounting surface of the mount head need not be flat in all embodiments. For example, in some embodiments, the device mounting surface may have raised areas in the location(s) where the connector(s) is/are disposed. Alternatively, if the portable electronic device has a shape that is not flat (e.g. curved), the mounting surface may have a complementary shape (e.g. a complementary curved shape).

The power transfer mechanism in the mount head portion of a powered wall mount need not necessarily be a Qi™ charging transmitter. Other wireless or wired power transfer mechanisms may be used in alternative embodiments. For example, the power transfer mechanism could be a split-core transformer segment as described in PCT Application No. PCT/CA2017/050942 entitled "SPLIT-CORE TRANSFORMER WITH ARTICULATING CORE SEGMENTS AND DEVICES" filed Aug. 9, 2017 or in U.S. Patent Application Ser. No. 62/372,776 filed Aug. 9, 2016, the contents of each of which are hereby incorporated by reference. Split-core transformers for power transmission are also described in Dwayne Servidio and Anthony Bruno, "Modeling of Split-Core Transformers for Power Transmission", presented at the International Magnetics Conference, Stockholm, Sweden, 13-16 Apr. 1993, (www.dtic.mil/dtic/tr/fulltext/u2/a282782.pdf), the contents of which are hereby incorporated herein by reference. Alternatively, the power transfer mechanism may be one or more wired elements, such as a plurality of exposed electrical contacts (e.g. surface contacts or pogo pins) in a surface of the mount head that are configured to electrically connect with a plurality of complementary electrical contacts in a portable electronic device mounted thereto. For example, the power transfer between the mount head and the portable electronic device may comprise power transfer via magnetic connectors providing an electrical coupling function, as described in PCT Publication No. WO 2015/070321 or U.S. Pat. No. 9,312, 633, referenced above.

In some embodiments, the mount head may include multiple wireless or wired elements, to allow power and/or data to be exchanged with the portable electronic device via multiple complementary wireless or wired elements in the portable electronic device.

Different embodiments of cover plate may be configured for mating with different types of electrical outlets. For example, the cover plate may be adapted for mating with Decora™ duplex receptacles having only a single rectangular opening for both sockets. Other alternative cover plate embodiments may be configured to accommodate different numbers, shapes and/or placements of sockets of an electrical outlet.

In the embodiments described above, the power conversion circuitry that supplies the power transfer mechanism with electric power is an AC-to-DC converter, which generates DC electric power. For clarity, use of AC-to-DC converter is not absolutely required for all embodiments. In some embodiments, the power transfer mechanism may be powered by AC electric power, which may have a different frequency and/or voltage from AC mains power. In such embodiments, the power conversion circuitry will not be an AC-to-DC converter but will instead be circuitry for changing the frequency and/or voltage of the AC mains power to suitable values or levels.

In some embodiments, the cover plate portion of a powered wall mount may be adapted to mate with an electrical switch instead of an electrical outlet. Because standard light switches do not provide a neutral screw, manual wiring of a "neutral" wire to the wall mount may be required. As such, installation of such wall mount embodiments may be considered more labor-intensive and less safe than installation of wall mount embodiments whose cover plates are adapted for mating with an electrical outlet.

Other modifications may be made within the scope of the following claims.

What is claimed is:

1. A powered wall mount installable onto a wall at or near an electrical outlet, the electrical outlet having a pair of terminals to supply the electrical outlet with mains power, the powered wall mount comprising:
   a cover plate having at least one opening, the cover plate to cover the electrical outlet without blocking any sockets of the electrical outlet, the cover plate including a pair of resilient contacts to resiliently contact respective terminals of the pair of terminals of the electrical outlet upon mating of the cover plate with the electrical outlet and thereby receive mains power;
   a mount head, separate from the cover plate, including:
      a device mounting surface;
      at least one magnetic connector to hold a portable electronic device at the device mounting surface; and
      a power transfer mechanism to transfer power to the portable electronic device when held at the device mounting surface by the at least one magnetic connector;
   power conversion circuitry in electrical communication with the pair of resilient contacts of the cover plate and with the power transfer mechanism of the mount head, the power conversion circuitry to convert the mains power supplied by the electric terminals into converted alternating current (AC) or direct current (DC) electric power for powering the power transfer mechanism; and
   a power cable to conduct either the mains power or the converted AC or DC electric power from the cover plate to the mount head.

2. The powered wall mount of claim 1 wherein the power conversion circuitry comprises an AC-to-DC converter and wherein the converted electric power is DC electric power.

3. The powered wall mount of claim 1 wherein the power conversion circuitry is associated with the cover plate and wherein the power cable is to conduct the converted electric power.

4. The powered wall mount of claim 1 wherein the power cable is flat and has a thickness of less than 0.5 millimeters.

5. The powered wall mount of claim 4 wherein a wall-facing surface of the flat power cable comprises an adhesive suitable for adhering the power cable to the wall.

6. The powered wall mount of claim 1 wherein the mount head has a substantially flat cuboid shape with a front face of the mount head comprising the device mounting surface.

7. The powered wall mount of claim 1 wherein the power transfer mechanism of the mount head comprises an inductive charging transmitter.

8. The powered wall mount of claim 1 wherein the at least one magnetic connector to hold the portable electronic device at the device mounting surface comprises a ferrous element to attach a magnetic element of the portable electronic device.

9. The powered wall mount of claim 1 wherein the at least one magnetic connector to hold the portable electronic device at the device mounting surface comprises a permanent magnet.

10. A kit for installing a powered wall mount onto a wall at or near an electrical outlet, the electrical outlet having a pair of terminals to supply the electrical outlet with mains power, the kit comprising:
   a cover plate having at least one opening, the cover plate to cover the electrical outlet without blocking any sockets of the electrical outlet, the cover plate having a pair of resilient contacts to resiliently contact respective terminals of the pair of terminals of the electrical outlet upon mating of the cover plate with the electrical outlet and thereby receive mains power;
   a mount head including:
      a device mounting surface;
      at least one magnetic connector to hold a portable electronic device at the device mounting surface; and
      a power transfer mechanism to transfer power to the portable electronic device when held at the device mounting surface by the at least one magnetic connector;
   power conversion circuitry associated with either the cover plate or the mount head, the power conversion circuitry to convert the mains power supplied by the terminals into converted alternating current (AC) or direct current (DC) electric power for powering the power transfer mechanism; and
   a power cable of customizable length to conduct either the mains power or the converted AC or DC electric power from the cover plate to the mount head.

11. The kit of claim 10 wherein the power conversion circuitry comprises an AC-to-DC converter and wherein the converted electric power is DC electric power.

12. The kit of claim 10 wherein the power conversion circuitry is associated with the cover plate and wherein the power cable is to conduct the converted electric power.

13. The kit of claim 10 wherein the power cable is flat, has a thickness of less than 0.5 millimeters, and has an adhesive wall-facing surface.

14. The kit of claim 10 wherein at least one of the cover plate and the mount head comprises a terminal block to facilitate electrical attachment of one of the ends of the power cable.

15. The kit of claim 10 wherein the at least one magnetic connector to hold the portable electronic device at the device mounting surface comprises a ferrous element to attach a magnetic element of the portable electronic device.

16. A method of installing a powered wall mount onto a wall at or near an electrical outlet, the electrical outlet having a pair of terminals to supply the electrical outlet with mains power, the powered wall mount having a cover plate portion with at least one opening and a pair of resilient contacts, a mount head portion separate from the cover plate portion, the mount head portion including a device mounting surface, at least one magnetic connector to hold a portable electronic device at the device mounting surface, and a power transfer mechanism to transfer power to the portable electronic device when held at the device mounting surface by the at least one magnetic connector, power conversion circuitry in electrical communication with the pair of resilient contacts of the cover plate portion and with the power transfer mechanism of the mount head portion, the power conversion circuitry to convert the mains power supplied by the electric terminals into converted alternating current (AC) or direct current (DC) electric power for powering the power transfer mechanism; and a power cable portion to conduct either the mains power or the converted AC or DC electric power from the cover plate to the mount head, the method comprising:

mating the cover plate portion of the powered wall mount with the electrical outlet to cover the electrical outlet without blocking any sockets of the electrical outlet, the mating causing the pair of resilient contacts to resiliently contact respective terminals of the pair of terminals of the electrical outlet upon the mating and thereby receive mains power;

affixing the mount head portion of the powered wall mount to the wall; and adhering the power cable portion to the wall.

17. The method of claim 16 further comprising:

prior to the adhering:

customizing a length of the power cable portion; and electrically attaching an end of the customized-length power cable portion to either the cover plate portion or the mount head portion by crimping or clamping the end of the customized-length power cable portion in a terminal block of the cover plate portion or the mount head portion.

18. The method of claim 16 wherein the affixing of the mount head portion comprises adhering the mount head portion to the wall using adhesive strips.

19. The method of claim 16 wherein the at least one magnetic connector to hold the portable electronic device at the device mounting surface comprises a ferrous element to attach a magnetic element of the portable electronic device.

20. The method of claim 16 wherein the at least one magnetic connector to hold the portable electronic device at the device mounting surface comprises a permanent magnet.

\* \* \* \* \*